UNITED STATES PATENT OFFICE.

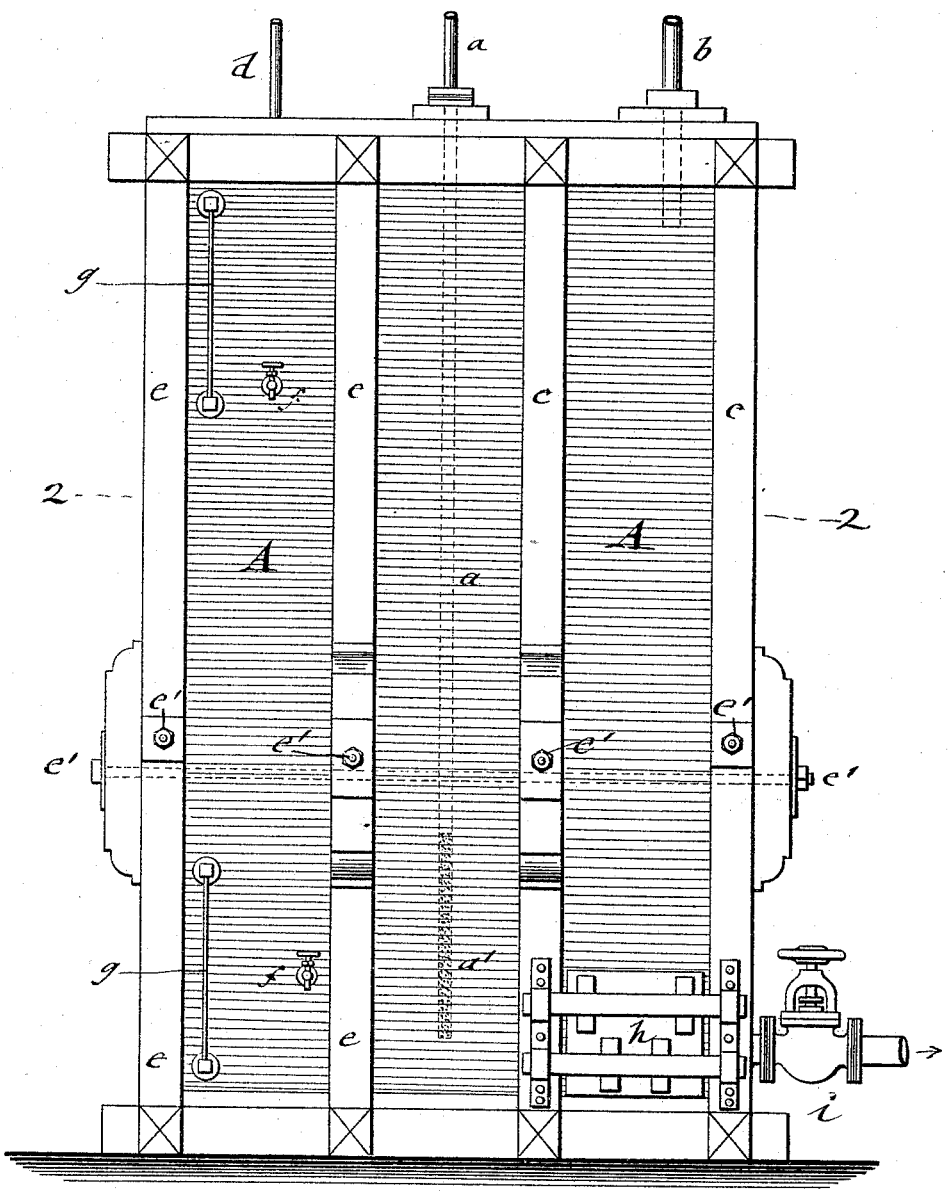

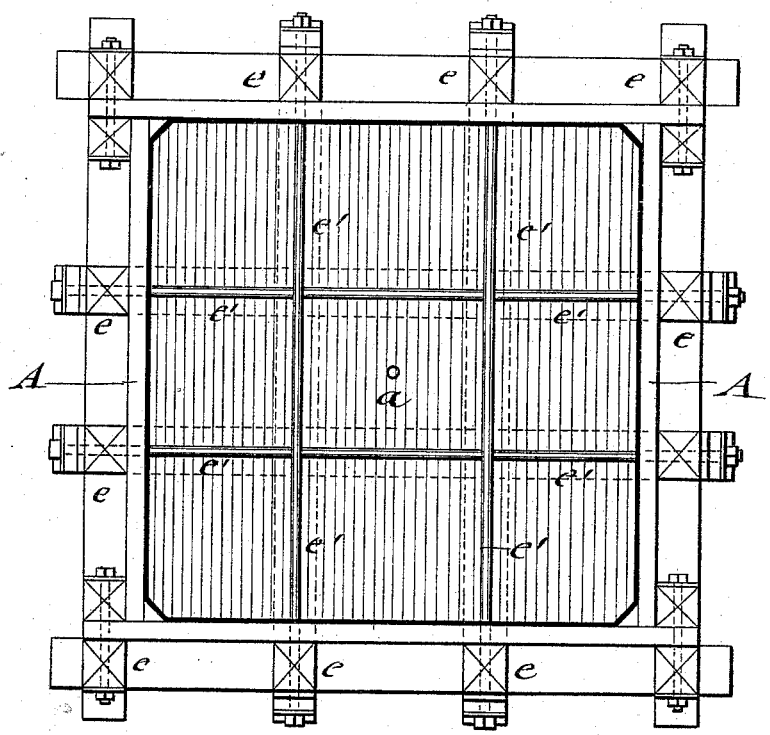

VIGGO DREWSEN, OF CHRISTIANIA, NORWAY, ASSIGNOR TO HIMSELF, HARTWIG BACHE-WÜG, AND CARL BACHE-WÜG, OF SAME PLACE.

PROCESS OF REGAINING SULPHUROUS ACID.

SPECIFICATION forming part of Letters Patent No. 492,196, dated February 21, 1893.

Application filed January 21, 1891. Serial No. 378,610. (No specimens.)

*To all whom it may concern:*

Be it known that I, VIGGO DREWSEN, a citizen of the Kingdom of Norway, and a resident of Christiania, Norway, have invented certain new and useful Improvements in Processes of Regaining Sulphurous Acid, of which the following is a specification.

This invention relates to an improved process of regaining the sulphurous acid gases that go to waste in the sulphite-process, so that a considerable saving in sulphur is produced, a more concentrated cooking liquor obtained and the temperature of the liquor raised, and the time of cooking is considerably shortened; and the invention consists of a process of regaining the sulphurous acid from the gases in the digester after the cooking process is completed by conducting the gases from the digester into the liquor which is to be used for cooking the next charge of wood and absorbing the sulphurous acid gases contained therein, so that the strength of the cooking liquor and its temperature are increased and the liquor rendered more effective for the cooking process.

In the accompanying drawings, Figure 1 represents a side-elevation of an apparatus for carrying out my improved process of regaining the waste sulphurous gases escaping from the digester after a charge is cooked, and Fig. 2 is a horizontal section of the same, on line 2 2, Fig. 1.

Similar letters of reference indicate corresponding parts.

In the manufacture of sulphite-cellulose, the wood is reduced to the required size and placed into the digester, after which the cooking liquor is added and heated by steam. The cooking liquor contains about 2.08 per cent. of free sulphurous acid and about 2.02 per cent. of sulphurous acid combined with lime, together about 4.10 per cent. of sulphurous acid. The "cooking" process is continued for from sixteen to twenty hours. The gases and vapors contain a considerable quantity of acid, and in conducting the operation in accordance with my invention, they are conducted into a lead-lined tank A, into which the cooking liquor is placed. The tank A is closed at the top and provided with a pipe $a$ at its center that extends nearly to the bottom of the tank, and that is provided at the lower end with perforations for the escape of the gases which percolate through the liquor in the tank and are absorbed by the same. A second pipe $b$ that terminates near the top of the tank is used for charging the same with the liquor, while a smaller pipe $d$ at the top permits the escape of air from the tank during the filling of the same. The tank A is further provided with gages $g$, for indicating the level of the charge in the tank, and with testing faucets $f$ for drawing off small quantities of the liquor. The walls of the tank A are supported by means of upright timbers $e$ and transverse bolts $e'$, that pass through the same, as shown in Fig. 2 and in dotted lines in Fig. 1. At the lower end of the tank A is arranged a man-hole $h$ and a valved outlet-pipe $i$, through which the liquor is conducted to the digester. The gases are conducted from the digester, through the supply-pipe $a$ into the lower part of the tank A, in which the liquor for cooking the next charge of wood is placed. The gases are forced under pressure into the tank A and percolated through the liquor in the same, so that the entire quantity of sulphurous acid gases thus supplied are absorbed by the liquor in the tank A, which liquor is thereby strengthened so as to be enriched in acid, the increase being nearly 1.5° Baumé. The cooking liquor contains now about 3.42 per cent. free and 1.99 per cent. sulphurous acid combined with lime, together 5.41 per cent., which corresponds to about 27.5 kilograms sulphur in one cubic meter of liquor. The consumption of sulphur per ton of cellulose is decreased from one hundred and eighty-one kilograms to 157.4, while by the heating of the cooking liquor from 15° to 60° centigrade the consumption of coal is reduced from five hundred and fifty-eight kilograms to three hundred and ninety-four kilograms per ton. By the improved process the time of cooking of the charge of wood is shortened, owing to the temperature of the cooking liquor being thus raised a considerable saving in sulphur and fuel produced and a whiter fiber or cellulose obtained.

Having thus described my invention, I claim as new and desire to secure by Letters Patent—

The method of utilizing the waste gases discharged from the digester in the process of making sulphite pulp which consists in forcing said gases in a hot state into a new charge of cooking liquor at or near the bottom thereof and causing said gases to percolate through said liquor in direct contact therewith, the sulphurous acid contained in said gases being absorbed by said liquor, whereby the temperature and strength of the cooking liquor is increased, substantially as described.

In testimony that I claim the foregoing as my invention I have signed my name in presence of two subscribing witnesses.

VIGGO DREWSEN.

Witnesses:
OSC. WINGE,
JACOB WYLLER.